United States Patent

Gilmore

[15] 3,701,013
[45] Oct. 24, 1972

[54] POWER FACTOR RELAY

[72] Inventor: Thomas P. Gilmore, Wauwatosa, Wis.

[73] Assignee: Allis-Chalmers Manufacturing Company, Milwaukee, Wis.

[22] Filed: March 18, 1971

[21] Appl. No.: 125,531

[52] U.S. Cl. ..................................324/83 D, 328/133
[51] Int. Cl. ........................G01r 25/00, H03d 13/00
[58] Field of Search .324/83 R, 83 A, 83 D; 328/133, 328/109; 317/48

[56] References Cited

UNITED STATES PATENTS

| | | | |
|---|---|---|---|
| 3.588,710 | 6/1971 | Masters | 324/83 D X |
| 3,517,322 | 6/1970 | Lay | 328/133 |

Primary Examiner—Alfred E. Smith
Attorney—Lee H. Kaiser et al.

[57] ABSTRACT

Power factor measuring apparatus receives voltage and current input signals representative of the voltage on and the current in a power line and derives rectangular voltage and current pulses from half cycles of one polarity of the input signals. The timing cycle of an adjustable timer is initiated by the crossing of the zero axis by one of the input signals, and a clocked flip-flop receiving the timer output on its clock input and the rectangular pulse derived from the other input signal on a set input changes states to provide logic 1 on its Q output when the rectangular pulse is present when the timer output is received, thereby indicating that the phase difference between voltage and current input signals is greater than the power factor bandwidth established by adjustment of the timer delay interval.

12 Claims, 6 Drawing Figures

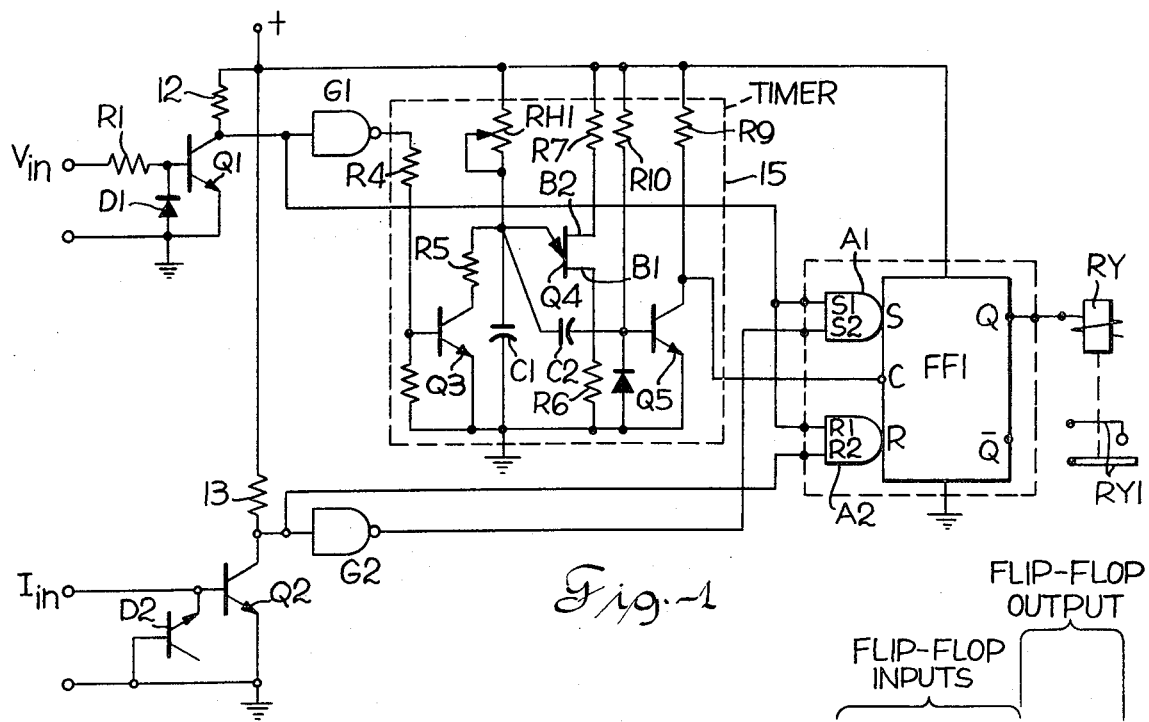
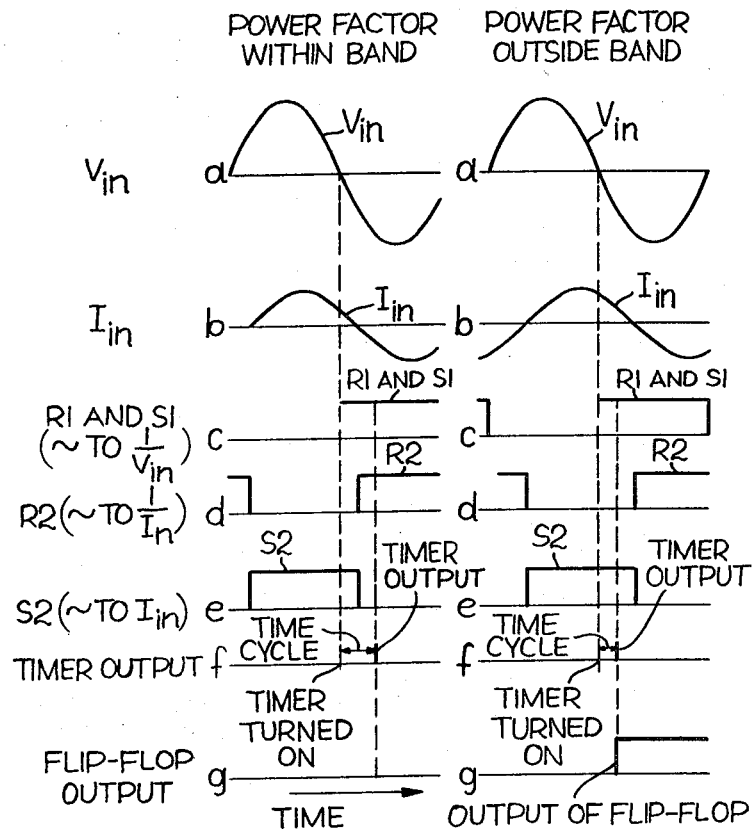
Fig.1
Fig.2    Fig.3    Fig.4

POWER FACTOR RELAY

This invention relates to apparatus for measuring power factor.

BACKGROUND OF THE INVENTION

A need exists for a sensitive static power factor control for use in the regulation of voltage on an alternating current electrical power distribution system. Both step voltage regulators and switched capacitors may be used to regulate voltage on a power distribution system. The voltage regulator with a tapped series winding is used to maintain a close accurate control of voltage throughout the load cycle to minimize system voltage drop, maximize revenue and increase feeder capacities. Capacitors provide a means of correcting system power factor and, as a result of this correction, system feeders are relieved of carrying unnecessary reactive power. The most popular device for controlling switched capacitors is the voltage sensitive control which is used in more than 50 percent of switched capacitor installations. Optimum benefit cannot, however, be obtained from regulators and capacitors if both are governed by voltage control. The capacitor voltage sensitive control alone is not adequate since it is generally less sensitive to voltage, is operated over a wider bandwidth, and is subject to a longer time delay than a standard step regulator control. What often results is that the regulator corrects for low voltage caused by a badly lagging power factor or the capacitors overcorrect the power factor resulting in both high voltage and leading power factor. On occasion a hunting condition is set up between the regulator and switched capacitors as a result of their overlapping voltage level settings. In addition, neither the regulator nor the switched capacitors are operated in response to power factor.

Switched capacitors and voltage regulators can be economically coordinated if a sensitive power factor measuring device is applied to the regulator rather than to the capacitors to switch in response to voltage. The power factor control de-energizes the regulator for a given time, such as 2 to 5 minutes, if the system power factor falls outside a predetermined band, and during this time the capacitors are able to switch in response to voltage. The regulator control is re-energized after the prescribed time delay and brings the system voltage again under close, regulated control at an improved power factor. Such a control offers the advantages of preventing the regulator from operating when power factor correction is required as well as making voltage controlled switched capacitors more sensitive to power factor. Such arrangement also reduces the number of controls and eliminates the need for additional metering potential transformers and current transformers since they are part of the regulator.

It is an object of the invention to provide an improved static power factor relay which is particularly adapted for the coordination of capacitors and step voltage regulators in distribution power systems, is simpler and less expensive but more accurate than prior art power factor control devices, and provides an output signal when the power factor drops out of a predetermined band.

These and other objects and advantages of the invention will be more readily apparent from the following detailed description when considered in conjunction with the accompanying drawing wherein:

FIG. 1 is a schematic circuit diagram of a preferred embodiment of power factor relay embodying the invention;

FIGS. 2 and 3 illustrate waveforms within the circuit of FIG. 1 when the power factor is, respectively, within and without the predetermined band;

FIG. 4 is a truth table for the circuit of FIG. 1;

Figure 5:
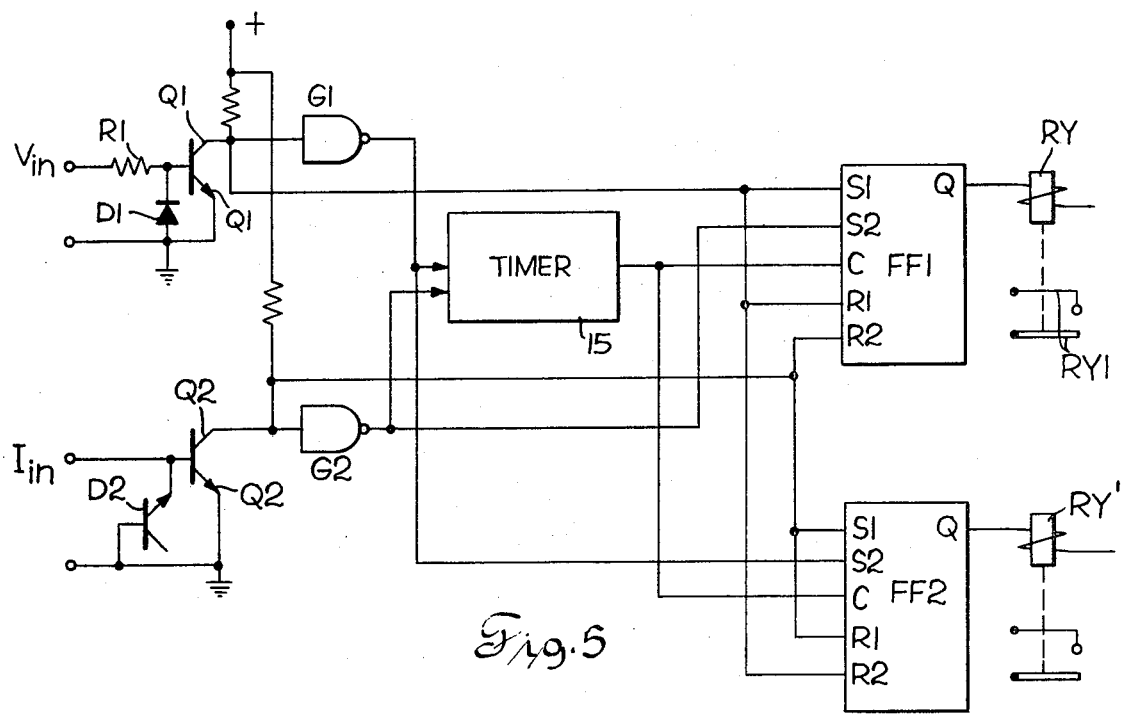
FIG. 5 is a block diagram of an embodiment of the invention which measures both leading and lagging power factor.

The power factor relay of the invention shown in FIG. 1 measures the actual time difference between current and voltage, compares the measured time to the preselected output of a timer, and produces an output signal indicating whether the measured time difference is less than or greater than the set time. Inasmuch as power factor is proportional to the time difference between the current and voltage in a power line, such output signal is indicative of whether the power factor is within or outside of the desired bandwidth.

In order to obtain an accurate measure of the time difference between current and voltage waves in the power line, the zero crossings of the voltage and current are determined by transistors Q1 and Q2 respectively. The voltage input signal $V_{in}$ shown in FIG. 2a and 3a may be derived from the potential transformer (not shown) of the step voltage regulator to be controlled and is applied through a resistor R1 to the base of transistor Q1 which may have its emitter grounded. A diode D1 connected across the base-emitter junction of transistor Q1 shunts the negative half cycles of the voltage input signal to ground. The current input signal $I_{in}$ shown in FIGS. 2b and 3b is derived from the current transformer (not shown) of the step voltage regulator to be controlled and is applied to the base of transistor Q2 which has its emitter grounded. A diode formed by the emitter-base junction of a NPN transistor D2 connected across the base-emitter junction of transistor Q2 shunts negative half cycles of the current input signal to ground. The collectors of transistors Q1 and Q2 are connected to the positive terminal of the power supply through resistors 12 and 13 respectively, and NPN transistors Q1 and Q2 are biased so that they saturate very close to the zero negative-going crossings of the voltage and current waves $V_{in}$ and $I_{in}$.

The elements comprising the timer 15 are shown within the dotted line rectangle. The collector of transistor Q1 is connected to both the S1 (set) and R1 (reset) inputs of a clocked master-slave R–S flip-flop FF1 which may be similar to the type MC664P flip-flop sold by Motorola Inc. The collector of transistor Q1 is also connected through a NOR gate inverting amplifier G1 and a resistor R4 to the base of an NPN shunting transistor Q3 of the timer to maintain it conducting during the positive half cycles of the voltage input signal $V_{in}$. Shunting transistor Q3 is connected in series with a resistor R5 across a timing capacitor C1 of timer 15 and prevents charging of timing capacitor C1 during the positive half cycles of the voltage input wave. When the input voltage signal $V_{in}$ crosses the zero axis in the negative-going direction, the base of transistor Q1 becomes reverse biased and it turns off, thereby generating a rectangular wave (logic 1) voltage on its collector, shown in FIGS. 2c and 3c, which is impressed on the S1 and R1 inputs of flip-flop FF1. The logic 1 voltage on the collector of transistor Q1 is converted to logic 0 by NOR gate G1 and impressed through resistor R4 upon the base of shunting transistor Q3, thereby turning it off. The turning off of shunting transistor Q3 permits timing capacitor C1 to begin to charge from the positive voltage supply through a power factor setting potentiometer, or rheostat RH1 to begin the timing cycle.

The timer includes unijunction transistor Q4 having its base-one B1 connected through a resistor R6 to ground, its base-two B2 connected through a resistor R7 to the positive terminal of the power supply, and its emitter connected to the timing capacitor C1. When timing capacitor C1 charges to the peak point of unijunction transistor Q4, its emitter becomes forward biased to trigger transistor Q4 and discharge timing capacitor C1 to ground.

Timing capacitor C1 is also connected through a coupling capacitor C2 to the base of a normally conducting NPN transistor Q5 having its emitter grounded, its collector connected through a resistor R9 to the positive terminal of the power supply, and its base connected through a resistor R10 to the positive terminal of the power supply. The collector of transistor Q5 is also connected to the clock (C) input of flip-flop FF1. Since the base of transistor Q5 is connected through resistor R10 to the positive terminal of the power supply, it is forward biased when the voltage input signal $V_{in}$ is positive to thereby maintain logic 0 voltage on its collector and on the clock input (C) to flip-flop FF1.

The collector of transistor Q2 is connected to the R2 (reset) input of flip-flop FF1 and is also connected through a NOR gate inverting amplifier G2 to the S2 (set) input of flip-flop FF1. During the time that the current input signal $I_{in}$ (shown in FIGS. 2b and 3b) is positive, transistor Q2 is conducting so that its collector is at low potential and logic 0 voltage is thereby applied to the R2 input and also so that logic 1 output voltage from gate G2 is applied to the S2 input of flip-flop FF1 (as shown respectively in FIGS. 2d–3d and FIGS. 2e–3e). When the current input signal $I_{in}$ crosses the zero axis in the negative-going direction, the base of transistor Q2 becomes reverse biased and it turns off to thereby apply the logic 1 voltage at its collector to the R2 input and also apply the logic 0 output from gate G2 to the S2 input of flip-flop FF1.

Assume that the current input signal $I_{in}$ is lagging the voltage input signal $V_{in}$ and that the power factor is within the preselected band, as represented in FIG. 2, and further assume that both the voltage and current input signals $V_{in}$ and $I_{in}$ are positive. Under these conditions both transistors Q1 and Q2 are conducting, and the logic 0 on the collector of transistor Q1 (represented in FIG. 2c) maintains shunting transistor Q3 turned on so that timing capacitor C1 of the timer cannot charge. Further, under such conditions logic 0 is applied to the S1, R1, R2 inputs and logic 1 to the S2 input, but flip-flop FF1 does not change states because the base of transistor Q5 is forward biased, and thus the clock input to flip-flop FF1 is zero. Zero on the clock input locks flip-flop FF1 so that it cannot change states.

Now assume that the voltage input signal $V_{in}$ crosses the zero axis in the negative-going direction, thereby turning transistor Q1 off. The collector of transistor Q1 then goes to logic 1 voltage which provides a logic 0 output from gate G1 that turns off shunting transistor Q3 so that timing capacitor C1 can start charging to begin the timing cycle. The logic 1 voltage on the collector of transistor Q1 is impressed upon the S1 and R1 inputs of flip-flop FF1, but it cannot change states because the clock input is zero. When the current input signal $I_{in}$ crosses the zero axis in the negative-going direction, the base of transistor Q2 becomes reverse biased and it turns off. The collector of transistor Q2 goes to logic 1 voltage to apply logic 1 to the R2 input of flip-flop FF1, as shown in FIG. 2d, and the logic 0 output of gate G2 is applied to the S2 input of flip-flop FF1. However, flip-flop FF1 does not change states at this time because the clock input signal to flip-flop FF1 is zero, as shown in FIG. 2f. Timing capacitor C1 continues to charge until the potential thereon reaches the peak point potential of unijunction transistor Q4 at the end of the timing cycle to trigger it into conduction. Transistor Q4 discharges timing capacitor C1 and coupling capacitor C2 to ground through resistor R6, thereby lowering the potential of the electrode of capacitor C2 connected to the base of transistor Q5 so that transistor Q5 turns off. The potential of the collector of transistor Q5 goes to logic 1 and thus applies logic 1 voltage to the clock (C) input of flip-flop FF1, but flip-flop FF1 is not "set" because it has logic 0 on the S2 input. Flip-flop FF1 is only "set" to provide logic 1 voltage on its Q output when both the S1 and S2 inputs to the AND gate input portion A1 thereof are logic 1, and is only "reset" to provide logic 0 output on the $\overline{Q}$ output when both the R1 and R2 inputs to the AND gate input portion A2 thereof are logic 1, as shown in the truth table of FIG. 4. Consequently the Q output of flip-flop FF1 remains logic 0 and relay R is not operated when the power factor is within the preselected band set by potentiometer RH1.

Now assume the conditions represented in FIG. 3 wherein the power factor is outside the desired band. Transistor Q1 is turned off to render shunting capacitor Q3 nonconductive, and thus start the timing cycle, when the voltage input signal $V_{in}$ crosses the zero axis in the negative-going direction in the same manner as described relative to FIG. 2. Logic 0 voltage from the collector of transistor Q1 is applied to the S1 and R1 inputs of flip-flop FF1. However, the charge on timing capacitor C1 reaches the peak point potential of unijunction transistor Q4 to trigger it into conduction (as shown in FIG. 3F) before the current input signal $I_{in}$ crosses the zero axis in the negative-going direction, thereby turning transistor Q5 off and applying logic 1 voltage to the clock input of flip-flop FF1 while logic 1 is impressed on the S2 input and logic 0 on the R2 input of flip-flop FF1. The logic 1 on both the S1 and S2 inputs "sets" the flip-flop FF1 to logic 1 on its Q output when the clock input goes to logic 1 (as shown in the truth table of FIG. 4) and permits the flip-flop FF1 to transfer the data on its R and S inputs to the Q and $\overline{Q}$ outputs. The logic 1 on the Q output of flip-flop FF1 may operate a relay RY to close its contacts RY1 that may complete a circuit (not shown) to prevent operation of a step voltage regulator for a period of time required for capacitors to switch themselves in response to system voltage and thus bring the power factor back within the desired band.

Transistor Q5 turns back on after capacitor C2 discharges to ground through unijunction transistor Q4 and resistor R6, thereby removing the logic 1 clock input from flip-flop FF1 and locking it with logic 1 voltage on its Q output until the next negative-going zero crossing of the voltage input signal $V_{in}$. The unijunction transistor Q4 will remain conducting until the voltage input signal $V_{in}$ again goes positive to turn on transistors Q1 and Q3 in succession and thereby lower the potential on the emitter of unijunction transistor Q4.

Gate G2 assures that no ambiguous input, such as all logic 0's or all logic 1's, are presented to the inputs of flip-flop FF1.

Inasmuch as the disclosed embodiment samples the current voltage inputs every cycle, the flip-flop FF1 will set and reset as the power factor on the power line falls within and without the band preselected by the timing potentiometer RH1.

FIG. 5 illustrates in block form an embodiment of the invention which measures both leading and lagging power factor and differs from the embodiment of FIG. 1 principally in the addition of a second flip-flop FF2. The inputs to flip-flop FF1 are similar to those of the FIG. 1 embodiment, and the set and reset inputs to flip-flop FF2 are reversed from those to flip-flop FF1, i.e., the collector of transistor Q1 is coupled to the R2 (reset) input of flip-flop FF2 and the collector of transistor Q2 is coupled to the S1 (set) and R1 (reset) inputs of flip-flop FF2. The output of gate G1 is coupled to the S2 (set) input of flip-flop FF2 and to an input of timer 15 which may be similar to that of the FIG. 1 embodiment. The output of NOR gate G2 is also coupled to an input of timer 15 which will initiate the timing cycle.

When the power factor is lagging, the timer 15 is turned on to initiate the timing cycle when the voltage input signal $V_{in}$ crosses the zero axis in the negative-going direction to thereby turn off transistor Q1 and thus apply the logic 0 output from gate G1 to the input of the timer 15, as described above for the embodiment of FIG. 1. Assuming the power factor is outside the set bandwidth, the timer 15 provides a clock pulse to flip-flop FF1 before the current input signal $I_{in}$ crosses the zero axis, and flip-flop FF1 transfers to the set state with logic 1 on its Q output because it has logic 1 voltage on its S1 input (from the collector of nonconducting transistor Q1) and logic 1 voltage on its S2 input (from the output of gate G2) when the clock pulse is received.

When the power factor is leading, so the current input signal $I_{in}$ crosses the zero axis before the voltage input signal $V_{in}$, the timing cycle of timer 15 is initiated when the current input signal $I_{in}$ crosses the zero axis in the negative-going direction to turn off transistor Q2 and thus apply logic 0 input voltage to timer 15 from the output of gate G2. If the power factor is within the set bandwidth, transistor Q1 is turned off to provide logic 1 on its collector and logic 0 voltage output from gate G1 to the S2 set input of flip-flop FF2 (so the S1 and S2 inputs to flip-flop FF2 disagree) when timer 15 applies a clock pulse to flip-flop FF2, whereby flip-flop FF2 does not transfer to the set state. If the power factor is outside the set bandwidth, timer 15 provides a logic 1 pulse to the C (clock) input of flip-flop FF2 before the voltage input signal $V_{in}$ crosses the zero axis in the negative-going direction and while logic 1 is on the S1 input to flip-flop FF2 (from the collector of transistor Q2) and logic 1 is on the S2 input to flip-flop FF2 (from the output of gate G1). Flip-flop FF2 then transfers to the set state with logic 1 voltage on its Q output and operates relay RY'.

Figure 6:
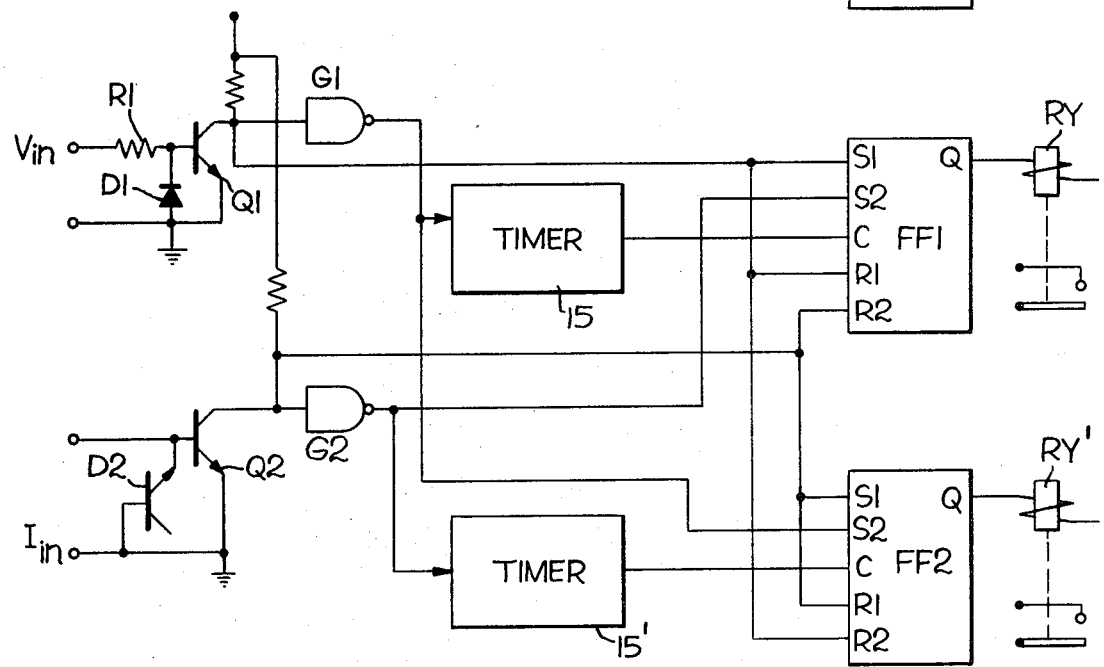
FIG. 6 is a block diagram of another alternative embodiment which measures both leading and lagging power factor, and wherein the bandwidth for leading and lagging power factor are independently adjustable.

FIG. 6 illustrates an embodiment of the invention which measures both leading and lagging power factor in the manner of the embodiment of FIG. 5 but which has independent bandwidth limits for leading and lagging power factor. A second timer 15' is provided whose input is from the output of gate G2 and whose output is to the clock (C) input of flip-flop FF2. The bandwidth for lagging power factor is set by adjusting rheostat RH1 of timer 15 and the bandwidth for leading power factor may be independently established by adjusting rheostat RH1 of timer 15'.

It will be appreciated that the output of flip-flops FF1 and FF2 can be coupled to additional timing means if it is desired to provide additional time delay before operation of the step voltage regulator is prevented.

It should be understood that I do not intend to be limited to the particular embodiments shown and described for many modifications and variations thereof will be readily apparent to those skilled in the art.

The embodiments of the invention in which an exclusive property or privilege is claimed are defined as follows:

1. Power factor measuring apparatus comprising, in combination, means for deriving voltage and current signals representative of the voltage on and the current in an alternating current power line, means for generating rectangular pulses from the half cycles of one polarity of one of said signals, timing means turned on by the crossing of the zero axis at the trailing edge of each said half cycle of said one polarity of the other of said signals and being adapted to provide an output timing signal a preselected interval after it is turned on, and power factor measuring means receiving said timing signal and said rectangular pulses as inputs for providing a first output when said rectangular pulse is present when said timing signal is received to thereby indicate power factor is outside a preselected band and for providing a second output when said said rectangular pulse is absent when said timing signal is received to thereby indicate that power factor is within said preselected band.

2. Power factor measuring apparatus in accordance with claim 1 wherein said timing means is selectively adjustable to vary said interval and said one signal is said current signal and said timing means is turned on at the trailing edge of said half cycle of said voltage signal and said measuring means provides a continuous unidirectional first output when lagging power factor is outside said preselected band.

3. Power factor measuring apparatus in accordance with claim 1 wherein said timing means is selectively adjustable to vary said interval and said one signal is said voltage signal and said timing means is turned on at the trailing edge of said current signal and said measuring means provides a continuous unidirectional first output when leading power factor is outside said preselected band.

4. Power factor measuring apparatus in accordance with claim 1 wherein said one and said other signals are said current and voltage signals respectively and said measuring means indicates whether lagging power factor is within said preselected band and wherein said timing means is turned on by the crossing of the zero axis by each half cycle of one polarity of said voltage or said current signal, and including means for generating rectangular voltage pulses from the half cycles of one polarity of said voltage signal and second power factor measuring means receiving said timing signal and said rectangular voltage pulse as inputs for providing a first output when said rectangular voltage pulse is present when said timing signal is received to thereby indicate leading power factor is within a preselected band and for providing a second output when said rectangular voltage pulse is absent when said timing signal is received to thereby indicate leading power factor is outside said preselected band.

5. Power factor measuring apparatus comprising, in combination,
means for deriving voltage and current signals representative of the voltage on and the current in an alternating current power line,
means for generating rectangular pulses from the half cycles of one polarity of one of said signals,
timing means turned on by the crossing of the zero axis at the trailing edge of each said half cycle of said one polarity of the other of said signals and being adapted to provide an output timing signal a preselected interval after it is turned on, said timing means including a timing capacitor in series with a time adjusting potentiometer, transistor means for shunting said timing capacitor, and means for turning said shunting transistor means on and off respectively during the half cycles of said one polarity and of the opposite polarity of said other signal, and
power factor indicating means receiving said timing signal and said rectangular pulses as inputs for providing a first output when said rectangular pulse is present when said timing signal is received and for providing a second output when said rectangular pulse is absent when said timing signal is received.

6. Power factor measuring means in accordance with claim 5 wherein said one signal is said current input signal and said means for generating rectangular pulses includes a transistor to whose base said current input signal is applied and which is biased to quickly saturate during said half cycles of said one polarity and to turn off during the half cycles of opposite polarity.

7. Power factor measuring apparatus in accordance with claim 5 wherein said timing means also includes a unijunction transistor which is triggered when the voltage on said timing capacitor reaches a predetermined potential, a timing output pulse generating transistor normally biased to be conducting, and means responsive to the triggering of said unijunction transistor to turn off said pulse generating transistor to derive said timing output pulse at the collector thereof.

8. Power factor measuring apparatus comprising, in combination,
means for deriving voltage and current signals representative of the voltage on and the current in an alternating current power line,
means for generating rectangular pulses from the half cycles of one polarity of one of said signals,
timing means turned on by the crossing of the zero axis at the trailing edge of each said half cycle of said one polarity of the other of said signals and being adapted to provide an output timing signal a preselected interval after it is turned on, and
power factor measuring means including a clocked R-S flip-flop receiving said rectangular pulses on a set input and said timing output pulses on the clock input thereof for providing a first output when said rectangular pulse is present when said timing signal is received and for providing a second output when said rectangular pulse is absent when said timing signal is received.

9. Power factor measuring apparatus in accordance with claim 8 and including means for generating rectangular second pulses from the half cycles of said one polarity of the other of said signals and wherein said flip-flop is of the master-slave type and also receives said second rectangular pulses as an input and is responsive to the presence of said rectangular pulses derived from both said current and voltage signals when said timing output signal is received on said clock input to provide said first output and is responsive to the presence of only one of said rectangular pulses when said timing output pulse is received on said clock input to provide said second output.

10. Power factor measuring apparatus comprising, in combination,
means for deriving voltage and current signals representative respectively of the voltage on and the current in an alternating current power line,
means for deriving from each half cycle of one polarity of said voltage signal a rectangular voltage pulse having a leading edge at the crossing of the zero axis by said voltage half cycle,
means for deriving from each half cycle of one polarity of said current signal a rectangular current pulse having a leading edge at the crossing of the zero axis by said current half cycle,
a timer adapted to provide an output signal a preselected interval after it is turned on and being adjustable to vary said preselected interval,
means responsive to said crossing of the zero axis by said half cycle of one of said signals for turning on said timer, and
flip-flop means receiving said timer output signal and said rectangular current and voltage pulses as inputs for providing a first continuous output when said timer output signal is received when both said rectangular pulses are present to thereby indicate the power factor is outside a preselected band and for providing a second continuous output signal when said timer output signal is received when one of said rectangular pulses is absent to thereby indicate the power factor is within said preselected band.

11. Power factor measuring apparatus comprising, in combination,
- means for deriving voltage and current signals representative respectively of the voltage on and the current in an alternating current power line,
- means for deriving rectangular voltage pulses from half cycles of one polarity of said voltage signal,
- means for deriving rectangular current pulses from half cycles of one polarity of said current signal,
- timing means adapted to provide a timing output a preselected interval after it is turned on,
- means for turning on said timing means in response to the crossing of the zero axis at the leading edge of said half cycle of one polarity of either said voltage signal or said current signal,
- means including a first flip-flop receiving said timing output and said rectangular current pulses as inputs for indicating when lagging power factor is beyond a selected band, and
- means including a second flip-flop receiving said timing output and said rectangular voltage pulses as inputs for indicating when leading power factor is beyond a selected band.

12. Power factor measuring apparatus comprising, in combination,
- means for deriving voltage and current signals representative respectively of the voltage on and the current in an alternating current power line,
- means for deriving rectangular voltage pulses from half cycles of one polarity of said voltage signal,
- means for deriving rectangular current pulses from half cycles of one polarity of said current signal,
- first and second timing means each of which is adapted to provide a timing output a preselected interval after it is turned on and being adjustable to vary said interval,
- means responsive to the crossing of the zero axis at the leading edge of said half cycle of one polarity of said voltage and current signals respectively for turning on said first and second timing means,
- lagging power factor indicating means receiving as inputs said rectangular current pulses and said timing output of said first timing means for providing a continuous output when said timing output is received when said rectangular current pulse is present to thereby indicate that lagging power factor is outside a preselected band, and
- leading power factor indicating means receiving as inputs said rectangular voltage pulses and said timing output of said second timing means for providing a continuous output when said timing output is received when said rectangular voltage pulse is present to thereby indicate that leading power factor is outside a preselected band.

* * * * *